(12) United States Patent
Keeney et al.

(10) Patent No.: US 6,370,824 B1
(45) Date of Patent: Apr. 16, 2002

(54) AUTOMOTIVE VEHICLE SEAL WITH DECORATIVE TRIM SEALING SURFACE

(75) Inventors: John D. Keeney, Fremont; Charles C. Mayfield, Jr., Portsmouth, both of NH (US)

(73) Assignee: Hutchinson Sealing Systems, Inc., Farmington Hills, MI (US)

(*) Notice: Subject to any disclaimer, the term of this patent is extended or adjusted under 35 U.S.C. 154(b) by 0 days.

(21) Appl. No.: 09/567,580

(22) Filed: May 10, 2000

(51) Int. Cl.[7] .............................................. E05D 15/16
(52) U.S. Cl. ........................................ 49/441; 49/490.1
(58) Field of Search ....................... 49/440, 441, 475.1, 49/489.1, 498.1, 496.1

(56) References Cited

U.S. PATENT DOCUMENTS

| | | | | |
|---|---|---|---|---|
| 5,014,646 A | * | 5/1991 | Dupuy et al. | 49/440 |
| 5,174,066 A | * | 12/1992 | Depuy | 49/502 |
| 5,183,613 A | * | 2/1993 | Edwards | 264/171 |
| 5,317,835 A | * | 6/1994 | Dupuy et al. | 49/441 |
| 5,343,655 A | * | 9/1994 | Miyakawa et al. | 49/441 |
| 5,414,961 A | * | 5/1995 | Tessier | 49/441 |
| 5,472,544 A | * | 12/1995 | Fukamichi et al. | 156/250 |
| 5,566,510 A | * | 10/1996 | Hollingshead et al. | 49/479.1 |
| 5,916,075 A | * | 6/1999 | Tanaka et al. | 49/441 |
| 6,023,888 A | * | 2/2000 | Dover | 49/441 |
| 6,082,048 A | * | 7/2000 | Backes et al. | 49/377 |

* cited by examiner

Primary Examiner—Curtis A. Cohen
(74) Attorney, Agent, or Firm—Dykema Gossett PLLC

(57) ABSTRACT

A weather strip seal for an automotive vehicle is provided. The weather strip seal includes a first extrusion of elastomeric material forming a sealing wing for sealing a first structure of the vehicle with respect to a second structure of the vehicle. The weather strip seal also includes a second ionomer material which is connected onto the first surface of the sealing wing and forms a thin layer thereon.

4 Claims, 1 Drawing Sheet

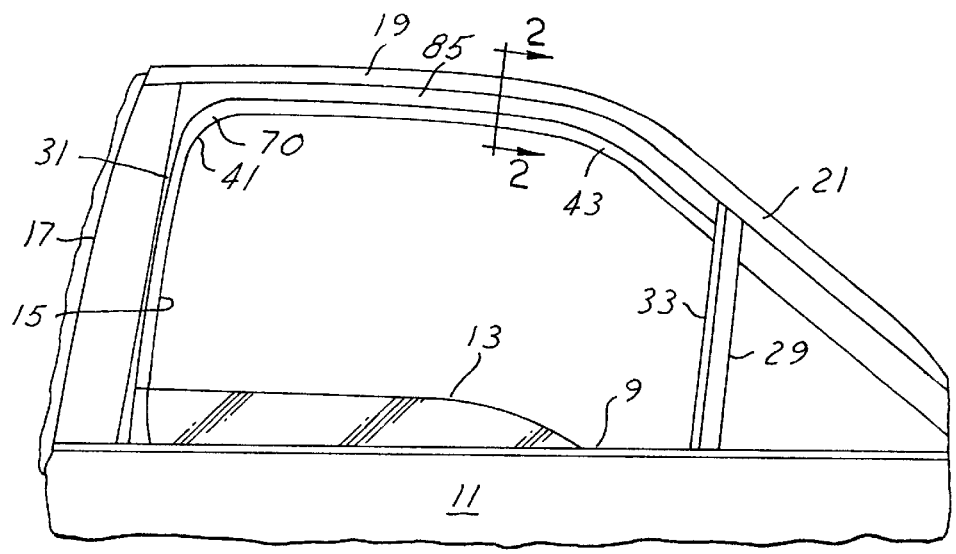
FIG. 1
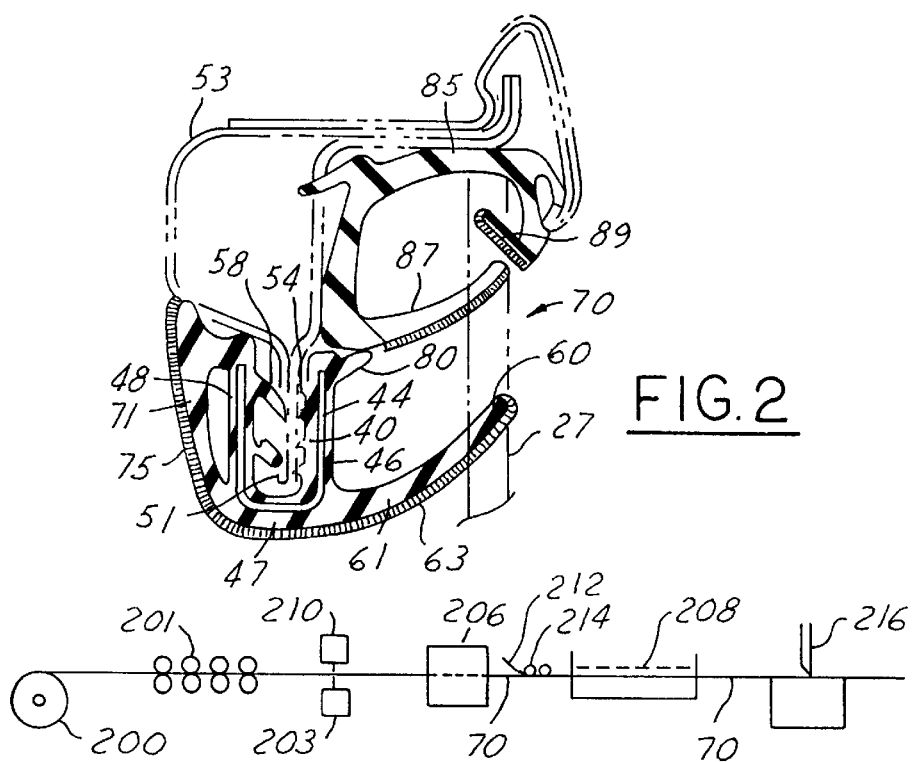
FIG. 2
FIG. 3

AUTOMOTIVE VEHICLE SEAL WITH DECORATIVE TRIM SEALING SURFACE

FIELD OF THE INVENTION

The field of the present invention is that of weather strip seals and decorative trim for automotive vehicles. More particularly, the field of the present invention is that of a sealing strip co-extrusion that combines the functions of a sealing strip with a decorative trim extruded directly onto a sealing surface of a sealing wing.

BACKGROUND OF THE INVENTION

Automotive vehicles have an exterior sheet metal, plastic or fiberglass body with a plurality of body panels. Virtually all automotive vehicles have movable and/or fixed windows in their side doors. Accordingly, there is a requirement for various designs of weather stripping to seal gaps between one body panel structure and another body panel structure or a body panel structure and a movable or fixed window.

The sealing requirements for a weather strip typically bring about a usage of materials such as EPDM, TPV or TPR rubber or a thermoplastic material. These materials typically have a durometer between 40 and 90 Shore A to allow the material to properly seal. When the weather strip is being applied to seal a movable structure such as a window, flocking or other low friction coating must be utilized.

Because most sealing strips are black due to the high amounts of carbon black used to mix the sealing material, decorative exterior trim is often utilized on automotive vehicles to conceal the sealing strip from view. The decorative trim is pigmented to blend, match, or contrast with the color of the vehicle body panels. Typically the decorative trim needs a glossy finish. Accordingly, most automotive trim strips are made of material with a high durometer, that being a harder material than the EPDM, TPV or TPR material.

When sealing a movable structure from the interior of the vehicle such as a window, a different problem is presented. A weather strip which seals the window from the interior of the vehicle will have a sealing wing which makes contact with the interior side of the window. To allow for proper sealing, the sealing wing typically is fabricated from the afore described EPDM rubber, TPV or TPR material having a durometer between 40 and 90 Shore A. Additionally the sealing wing will have flocking or a low friction coating added thereon. These materials, flocked or not flocked, are often difficult or expensive to provide in any color other than black. Even if such sealing materials are pigmented to another color, they do not present a glossy finish. It is desirable to provide a weather strip having a sealing wing that can seal an interior surface of the vehicle (such as a movable window) while at the same time provide a glossy finish seen from the exterior of the vehicle which may be optionally color matched with the body panels of the vehicle.

SUMMARY OF THE INVENTION

To make manifest the above-noted and other desires, the present invention is brought forth. In a preferred embodiment, the present invention brings forth a weather strip seal for an automotive vehicle. The weather strip seal has a carrier reinforcement. A first elastomeric material is extruded onto the carrier forming a retention portion and a sealing wing extending from the retention portion. The first elastomeric material may be a TPR, a TPV, or an EPDM rubber. Connected with the retention portion and also formed by the first elastomeric material is a sealing wing having a first surface for sealing with respect to a second movable structure by contacting the second movable structure with the first surface of the sealing wing. A second ionomer material layer is co-extruded onto the first surface of the sealing wing. The ionomer material forms a low friction layer and is held between 50 and 300 microns on the sealing wing. The low friction layer also has a gloss level between 20 and 90 degrees and has a durometer of 30 Shore A to 57 Shore D, making it harder than the first elastomeric material. Due to the thinness of the ionomer, the ionomer material can act as a seal. Due to the intrinsic properties of the ionomer material, a high gloss finish is provided which can be color coordinated with either the exterior body panels or the interior trim of the vehicle as desired.

It is an object of the present invention to provide a weather strip seal for an automotive vehicle having a thin layer of ionomer material for the sealing surface. It is an object of the present invention to provide a weather strip seal for an automotive vehicle having a low friction, glossy surface which can be used to seal a movable structure such as a window, from the interior of the vehicle.

BRIEF DESCRIPTION OF THE DRAWINGS

FIG. 1 is a side elevational view of a weather strip seal according to the present invention installed in the environment of a rear door of an automotive vehicle.

FIG. 2 is a sectional view taken along lines 2—2 of FIG. 1.

FIG. 3 is a schematic view illustrating a method of forming a seal according to the present invention.

DETAILED DESCRIPTION OF THE INVENTION

Referring to FIGS. 1 and 2, a rear door 11 having an extendable window panel 13 has a door opening 15 provided by a B-pillar portion of the window frame 17. The B-pillar portion 17 is joined to a header portion 19 and a C-pillar portion 21. The C-pillar portion 21 extends downward and has an intersection (not shown) with the belt line 9 of the door. In the rear door 11, the rear border of the window opening is provided by a division post 29. The B-pillar portion 17 has a channel seal 31 which connects with a header seal 85. The header seal 85 is joined with a division post seal 33. Radially inward from the seals 31, 33, 85 is a seal 70 according to the present invention. The seal 70 extends from the belt line 9 adjacent to B-pillar 17, the header 19 and the C-pillar 21 back to the belt line 9. The seal 70 extends through intersecting corner transition areas 41 and 43 and extends behind the division post 29.

Referring to FIG. 2, the seal 70 has a retention portion 40. The retention portion 40 has a U-shaped metal reinforcement 44. The retention portion 40 has an exterior leg 46 and an interior leg 48. The retention portion legs 46, 48 extend from a juxtaposed retention base portion 47. The retention portion 40 is pressed over (or as shown in FIG. 2 pressed upwards onto) a descending flange 51 which is a rigid structure provided by the upper frame 53 of a header portion of the door window opening frame. To help retain the retention portion 40 on the rigid structural flange 51 the retention portion 40 has interior extruded barbs 54 and 58. The seal 70 has a sealing wing 60 connected to the retention portion 40 and has extending therefrom the base portion 47. The sealing wing 60 typically will be extruded with the retention portion 40 and will have a durometer between 40 and 90, preferably 70 Shore A. The sealing wing 60 has a first surface 61 for sealing against the glass panel 27.

Connected on the first surface 61 is a thin layer of a second ionomer material 63. The ionomer material 63 (the thickness of the material being exaggerated for illustration purposes) is between 50 and 300 microns. The ionomer material is harder than the elastomeric material which forms a sealing wing. The ionomer material will typically have a durometer between 30 Shore A to 57 Shore D. The ionomer material also allows the sealing wing to have a gloss level between 20 and 90 degrees. The gloss level may be enhanced by film forming as later described. Ordinarily the ionomer is too hard to achieve a proper seal. However, the thinness of the ionomer combined with its soft backing provided by the remainder of the sealing wing allows the ionomer to function properly as a sealing material. Additionally, in many applications the ionomer provides a low friction surface which does not require the utilization of a low friction coating or flocking.

The seal 70 also has a concealment wing 71. The concealment wing 71 is connected to and extends from the retention base portion 47 and is more adjacent to the leg 48 which is opposite the glass panel 27. The concealment wing 71 has a second surface 75 which is generally continuous with the first surface 61. Accordingly surface 75 provides two aesthetic functions. The first function is to conceal the carrier portion leg 48 from the view of an occupant of the vehicle. The second function is to provide a colored surface which can be pigmented to coordinate with or match the exterior or interior colors of the vehicle. If desired, the extrusion of the sealing wing 60 retention portion 40 and concealment wing 75 can be pigmented to match the color of ionomer material 63.

Typically the sealing wing 60 and concealment wing 71 will be a common extrusion with the retention portion 40. The seal 70 also has a close out lip 80. The close out lip 80 aids in the retention of a header seal 85. The header seal 85 has a flocked sealing wing 87 which also seals the extreme upper interior surface of the movable glass panel 27. Additionally the header seal 85 has an exterior flocked sealing wing 89 which seals an exterior side of the glass panel 27.

Referring to FIG. 3, a coil 200 of stainless steel or other suitable carrier material is provided. The coil is run through a series of forming rollers 201 to form the desired shape. The carrier is then brought through an extrusion die 203 which is fed by an EPDM or other suitable elastomeric material extruder forming the retention portion 40 and sealing wing 60. The ionomer material is fed into an extrusion die 210 to form the thin layer of ionomer material 63. The extrusion is then passed through a curing oven 206. A polyester film 214 is added onto the ionomer to enhance its glossy appearance. After passage through the curing oven 206, the extrusion is run through a cooling bath 208. The film 214 is cut to length by a cutter at cutter station 216 and is removed before the extrusion is installed in the vehicle.

Although the invention has been described in connection with specific embodiments thereof, many alternatives, modifications and variations will be apparent to those skilled in the art in light of the foregoing description. Accordingly, it is intended to embrace all such alternatives, modifications and variations which fall within the spirit and broad scope of the accompanying claims.

We claim:

1. A weather strip seal for an automotive vehicle comprising:

a carrier reinforcement;

a first elastomeric material extruded onto said carrier forming a retention portion and a sealing wing extending from said retention portion, said retention portion connecting said weather strip seal with a first structure, and said sealing wing having a first surface for sealing said first structure with respect to a second movable structure by contacting said second movable structure with said first surface of said sealing wing; and a second ionomer material co-extruded onto said first surface of said sealing wing, said second material forming a low friction layer between 50 and 30 microns on said sealing wing first surface, having a gloss level between 20 degrees and 90 degrees and having a durometer between 30 Shore A to 57 Shore D and said second material being harder than said first material.

2. A weather strip seal for an automotive vehicle as described in claim 1 wherein said seal has a concealment wing with a second surface continuous with said sealing wing first surface and said second material forms a layer on said concealment wing.

3. A method of forming a weather strip seal for an automotive vehicle having a first extrusion of an elastomeric material forming a sealing wing for sealing a first structure on an automotive vehicle with respect to a second structure by contacting said second structure with a first surface of said sealing wing and a second ionomer material co-extruded onto said first surface of said sealing wing first extrusion forming a thin layer on said first sealing wing, said method comprising:

extruding onto a carrier said first elastomeric material forming said sealing wing;

extruding onto said first surface of said sealing wing a thin layer of an ionomer material between 50 and 30 microns on said sealing wing first surface, having a gloss level between 20 degrees and 90 degrees and having a durometer between 30 Shore A to 57 Shore D and said second material being harder than said first material.

4. A method of sealing a first structure of an automotive vehicle with respect to a second movable structure of said automotive vehicle, said method comprising:

connecting with said first structure a retention portion of a weather strip seal formed from an extrusion of a first material having a first hardness;

extending from said retention portion a sealing wing from a first elastomeric material integrally formed with said retention portion having a first surface for compliant contact with said second structure;

sealably contacting a thin ionomer low friction material co-extruded onto said sealing wing with said second structure between 50 and 30 microns on said sealing wing first surface, having a gloss level between 20 degrees and 90 degrees and having a durometer between 30 Shore A to 57 Shore D and said second material being harder than said first material.

* * * * *